United States Patent Office 3,703,350
Patented Nov. 21, 1972

3,703,350
DYEING SYNTHETIC POLYAMIDES WITH 1,4-DI-(HYDROXYALKYLAMINO)ANTHRAQUINONES
Paul Buecheler, Reinach, Basel-Land, and Karl Ulrich Steiner, Binningen, Basel-Land, Switzerland, assignors to Sandoz Ltd., Basel, Switzerland
No Drawing. Filed June 29, 1970, Ser. No. 50,955
Claims priority, application Switzerland, July 18, 1969, 11,032/69
Int. Cl. C09b 1/28; D06p 1/20
U.S. Cl. 8—39     9 Claims

ABSTRACT OF THE DISCLOSURE

A process for the dyeing and printing of synthetic polyamides with dyes of the 1,4-di-(hydroxyalkylamino)-anthraquinone series, in which the synthetic polyamides may be present in the form of filament, yarn or in any of the textile forms produced therewith.

---

The present invention relates to the use of selected dyes for the dyeing and printing of synthetic polyamide materials.

It has been found that dyes of the formula

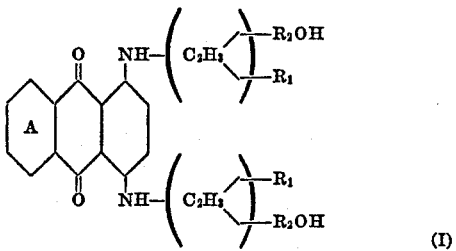

(I)

are eminently suitable for dyeing and printing filaments, yarns and textile materials of synthetic polyamides. In this formula the two symbols $R_1$, independently of each other, represent optionally substituted aryl radicals or optionally substituted lower alkyl radicals, the two $R_2$ symbols, independently of each other, represent the direct linkage or optionally substituted lower alkylene radicals, and the nucleus A may bear halogen atoms or hydroxyl groups as substituents.

By "lower" alkyl and alkylene radicals are understood radicals bearing, preferably, 1, 2, 3 or 4 carbon atoms. The preferred aryl radicals are phenyl radicals. Examples of preferred substituents on the alkyl, alkylene and aryl radicals are halogen atoms, hydroxyl, cyano, thiocyano, alkoxy (with 1 to 4 carbon atoms), acyl and acyloxy groups.

The preferred acyl groups conform to the formula R—Y— or R'—Z—, where

R represents a hydrocarbon radical which may bear the aforenamed substituents and/or hetero atoms, preferably an alkyl or phenyl radical, Y a radical —O—, —CO— or —SO$_2$—, R' a hydrogen atoms or R, Z a radical —CO—, —NR"CO— or —NR"SO$_2$—, and R' a rydrogen atom or R, Normally, free sulphonic acid and carboxylic acid groups are excluded as substituents in disperse dyes.

Fluorine and, more especially, chlorine and bromine atoms are suitable halogen atoms.

Dyes of Formula I are disclosed in French Pat. 883,-992. As yet, however, they have been employed only in the form of the sulphuric acid esters for the dyeing of cellulosic fibres (rayon). It is surprising that they should show such remarkably good suitability for dyeing and printing synthetic polyamide fibres.

The compounds of Formula I are produced by the condensation and oxidation, either simultaneously or consecutively, of 1 mole of a compound of the formula

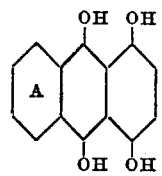

(II)

with 2 moles of an amine or of a mixture of amines of the formula

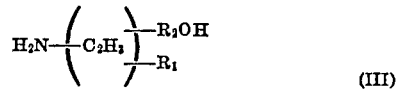

(III)

the compounds of Formula I are worked up to dye preparations by the normal methods, e.g. by grinding in the presence of dispersing agents and/or fillers. The mixtures are dried in vacuum or spray driers if dry preparations are desired. On the addition of a suitable volume of water, the preparations are applied by exhaust dyeing, pad dyeing or printing methods at long or short liquor ratio, as required.

The dyes are highly suitable as disperse dyes for exhaust dyeing from aqueous dispersion and for the printing of textiles of synthetic polyamide fibre, i.e. all the commercially available nylon types, on which they give brilliant blue dyeings and prints.

The known dyeing and printing methods are employed, for example that described in French Pat. 1,445,371.

The dyeings and prints have good all-round fastness, being notable for fastness to light, water, sea water, perspiration, gas fumes and ozone. The dyes reserve wool, are resistant to reduction and stable to the pre-cure and post-cure permanent press finishing processes.

In the following examples the parts are by weight and the temperatures in degrees centigrade.

EXAMPLE 1

A mixture of 7 parts of dye of the formula

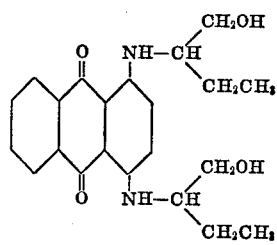

13 parts of powdered sulphite waste liquor and 100 parts of water is ground in a ball mill to give a paste which is dried in a spray drier.

4 parts of the dry preparation are dispersed in a small amount of water and the dispersion is run through a sieve into a bath consisting of 4000 parts of water and 4 parts of N - oleyl-N'-hydroxyethyl-N'-(3'-sulpho-2'-hydroxypropyl)-ethylenediamine. 100 parts of a fabric of nylon 66 polyamide fibre are entered into the dyebath at 20°, the temperature is increased to 100° in 30 minutes and the fabric dyed at the latter temperature for 1 hour.

On removal it is rinsed and dried. A brilliant, level blue dyeing is obtained which is fast to light, cross dyeing, washing, water, sea water, perspiration, gas fumes, ozone, sublimation, rubbing and solvents.

EXAMPLE 2

A mixture of 8 parts of dye of the formula

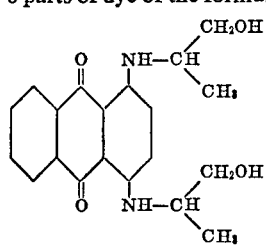

12 parts of sodium ligninsulphonate and 180 parts of water is ground in a glass-ball mill until a fine dispersion is formed. The dispersion is stirred into 350 parts of water, whereupon a mixture of 45 parts of refined carobbean gum and 405 parts of water is added as thickening agent. The resulting printing paste is screen printed on a polyamide fabric. After drying at 90° the print is fixed by steaming with saturated steam for 25 seconds at atmospheric pressure, rinsed with water at 20–25° and dried. A bright blue print is obtained with fastness properties comparable to those of the dyeing produced as in Example 1.

The procedures described in Examples 1 and 2 can be used for dyeing and printing polyamide fibres and textiles with the compounds named in the following, which are produced by condensation of the two hydroxyl groups of 1,4-dihydroxyanthraquinone with the stated amines:

| Mixture of: | Shade of dyeing |
|---|---|
| 1 - hydroxy-2-aminopropane and 1-hydroxy-2-aminobutane | Blue. |
| 1-hydroxy-2-amino-3-phenylpropane | Do. |
| 1-hydroxy-3-aminohexane | Do. |
| 1-hydroxy-3-aminobutane | Do. |
| 1-amino-2-hydroxybutane | Do. |
| 1-amino-2-hydroxypropane | Do. |

Having thus disclosed the invention, what we claim is:

1. In a process for dyeing or printing synthetic polyamide in the form of filament, yarn or textile product made thereof with anthraquinone dye free from sulphonic acid and carboxylic acid groups, the improvement wherein the anthraquinone dye is at least one compound of the formula

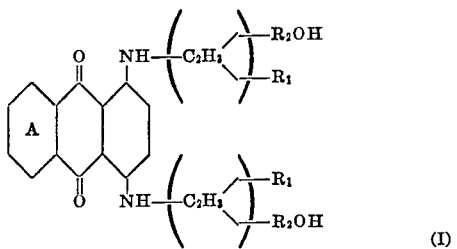

wherein
  each $R_1$ is, independently, alkyl with from 1 to 4 carbon atoms or phenyl;
  each $R_2$ is, independently, a direct linkage or alkylene with from 1 to 4 carbon atoms; and
  nucleus A is either unsubstituted or substituted, any substituent on substituted nucleus A being a member selected from the group consisting of halo and hydroxy.

2. A process according to claim 1 wherein the anthraquinone dye is at least one compound of the formula

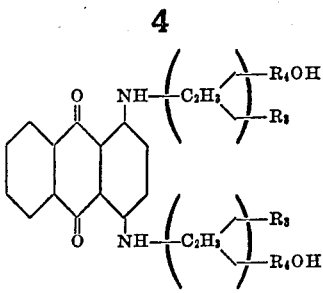

wherein
  each $R_3$ is alkyl with from 1 to 4 carbon atoms or phenyl and
  each $R_4$ is alkylene with from 1 to 4 carbon atoms.

3. A process according to claim 2 wherein at least one $R_3$ is alkyl with from 1 to 4 carbon atoms.

4. A process according to claim 2 wherein at least one $R_3$ is phenyl.

5. A process according to claim 2 wherein the anthraquinone dye is a compound of said formula.

6. A process according to claim 3 wherein the anthraquinone dye is a compound of said formula.

7. A process according to claim 1 wherein the anthraquinone dye is the compound of the formula

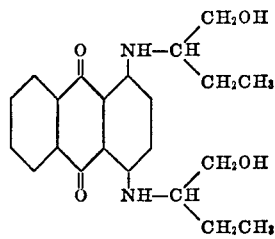

8. A process according to claim 1 wherein the anthraquinone dye is the compound of the formula

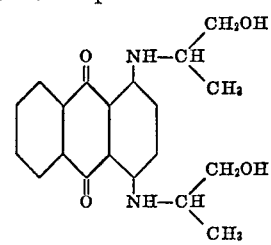

9. Synthetic polyamide dyed or printed according to claim 1.

References Cited

UNITED STATES PATENTS

| | | | |
|---|---|---|---|
| 1,911,316 | 5/1933 | Hauser et al. | 260—379 |
| 1,854,460 | 4/1932 | Dreyfus | 260—379 |
| 2,092,397 | 9/1937 | Koeberle et al. | 260—379 |
| 3,195,973 | 7/1965 | Fuchs et al. | 8—25 |
| 2,398,454 | 4/1946 | Towne et al. | 260—379 |
| 2,459,149 | 1/1949 | Coover et al. | 260—380 |
| 2,183,652 | 12/1939 | Lord et al. | |

OTHER REFERENCES

Lubs: Chem. of Syn. Dyes & Pigm., pp. 417–420, New York, 1955.

GEORGE F. LESMES, Primary Examiner

P. C. IVES, Assistant Examiner

U.S. Cl. X.R.

8—25; 260—379